May 2, 1972   A. L. MARKEL   3,660,285
METHOD OF SEPARATING FLUIDS HAVING DIFFERENT DENSITTIES
Filed Nov. 6, 1970

INVENTOR.
Arthur L. Markel

ATTORNEYS

United States Patent Office 3,660,285
Patented May 2, 1972

3,660,285
METHOD OF SEPARATING FLUIDS HAVING
DIFFERENT DENSITIES
Arthur L. Markel, Miami, Fla., assignor to Reynolds
Sub-Marine Services Corporation, Miami, Fla.
Filed Nov. 6, 1970, Ser. No. 87,435
Int. Cl. B01d 12/00, 17/02
U.S. Cl. 210—65
12 Claims

ABSTRACT OF THE DISCLOSURE

Methods of separating fluids having different densities wherein the fluids are first separated by passing them through an axial flow pump. Thereafter, the flow diameters of the fluids are altered so that the flow diameter of one of the fluids is substantially equal to the internal diameter of a suitable extractor tube. In one embodiment of the invention, a mandrel having a tapered end is inserted into one of the fluids after it has been separated in a manner to increase its flow diameter to that of the internal diameter of an extractor tube. In another embodiment, an additional fluid, such as air, is injected into the fluids being monitored thereby increasing the flow diameter of the fluid to be collected to that of the internal diameter of an extractor tube. In another embodiment, an obstruction is inserted downstream from the axial flow pump thereby creating a venturi flow whereby the extractor tube may be positioned to remove substantially all of the desired fluid. In all embodiments, it is preferred to use a section of conduit downstream from the axial flow pump that is at least translucent whereby visual inspection permits the extractor tube to be positioned properly for maximum withdrawal efficiency.

This invention relates to methods of separating fluids having different densities and more particularly, to methods of varying the flow diameters of fluids whereby an extractor tube member may be positioned properly to obtain an efficient withdrawal of one of the fluids.

In my copending patent application entitled Method of and Apparatus for Separating Fluids Having Different Densities, Ser. No. 833,105, filed June 13, 1969, now U.S. Pat. 3,595,392, patented July 27, 1971 there is disclosed one means of withdrawing one fluid, such as oil, from a conduit after it has been separated from another fluid, namely water, by means of its difference in density after the fluids have passed through a suitable separating device, such as an axial flow pump. The latter separates the fluids into a plurality of substantially concentric flow paths. As disclosed in my aforementioned patent application, a suitable extractor tube such as a Pitot tube, is used to withdraw oil from the water.

A problem exists in separating oil from the water so that there is substantially no mixing of the fluid in the extractor tube. One way of achieving this goal is to provide a Pitot tube having a plurality of concentrically arranged tubes with valve means for controlling the flow therethrough whereby the diameter of the extractor tube is effectively varied.

Despite the advantages of being able to increase or decrease the effective diameter of a Pitot tube in discrete steps, there is, nevertheless, a need to obtain even finer tuning in the adjustment of the flow diameter of the fluid being removed when compared with the internal diameter of the extractor tube.

In accordance with the present invention, the flow diameter of the fluids themselves are varied or altered on a substantially instantaneous basis whereby a constant diameter extractor tube may be used.

In one form of the present invention, a mandrel having a tapered end is inserted into the flow of a fluid to be separated. By observing and controlling the axial position of the mandrel, the flow diameter of the central fluid, namely the oil, may be split thereby effectively increasing its diameter until it matches the internal diameter of the extractor tube. In this manner, the extractor tube withdraws only the desired fluid and there is substantially no mixing of the desired fluid with the water.

In another embodiment, an additional fluid such as air is injected into the fluids to be separated so as to increase the flow diameter of the fluid to be collected on an effective basis. By observing the effective diameter of the fluid to be collected and by varying the amount of insertion of air, it is possible to withdraw only air and the desired fluid in the extractor tube. In this form of the invention, the air is inserted upstream from the means used to separate the fluids into concentric streams.

In still another embodiment of the present invention, an obstruction is placed downstream from the means used to separate the fluid into concentric streams. In this manner, the flow diameters of the fluids are compressed until such time as the diameter of the fluids sought to be separated substantially matches the internal diameter of the extractor tube. For example, it is possible to create a venturi effect whereby a flow diameter gradient is established which extends axially of the flow so that the extractor tube may be moved axially within the downstream conduit and positioned at a point at which the inner diameter of the extractor tube substantially matches the diameter of the fluid to be extracted.

The inherent advantages and improvements of the present invention will become more readily apparent upon considering the following detailed description of the invention and by reference to the drawings in which.

Figure 1:
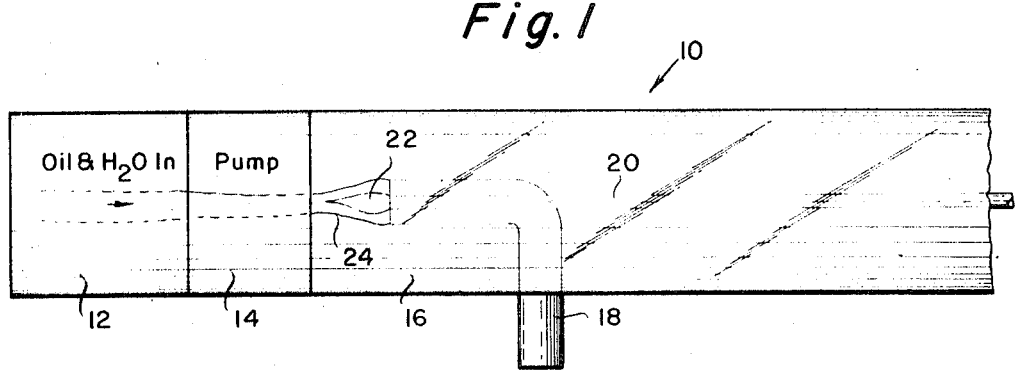
FIG. 1 is a side elevational view of a fluid separating system made in accordance with one embodiment of the present invention.

Referring now to FIG. 1, there is shown a fluid separating system, indicated generally at 10. This fluid separating system 10 has an inlet 12 for receiving fluids of different densities, such as oil and water. These fluids are introduced into a fluid separating means 14 which may by way of example be an axial flow pump such as is disclosed in my copending application Ser. No. 833,105, filed June 13, 1969. The outlet of such an axial flow is a plurality of substantially concentric streams with a fluid having a lower density being positioned centrally of fluids having greater densities. In a specific example, oil and water are separated in an outlet section 16 in which an extractor tube means, such as a Pitot tube 18 having a constant diameter is also positioned and which is reciprocable axially therein.

Figure 2:
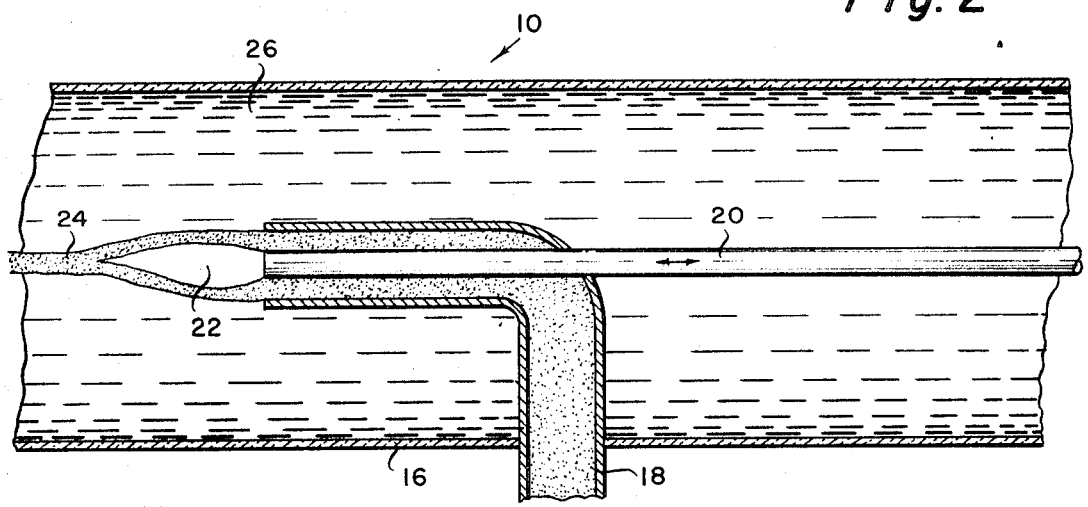
FIG. 2 is a side elevational view of the fluid separating system in FIG. 1, fragmentary in nature, and drawn to an enlarged scale.

Associated with Pitot tube 18 and extending therethrough is a mandrel means 20 having a tapered, substantially conical end portion 22. As is indicated in FIG. 2, mandrel means 20 is reciprocable axially within tube 18 in order to reach a desired position in the outlet section 16. Since the material of the outlet section 16 contains at least a portion thereof which is transparent or translucent, and for purposes of this invention must be at least translucent, it is possible to select any desired position for the mandrel means 20. The fluids such as oil 24 and water 26 are readily observable in such an arrangement insofar as their flow diameters are concerned because the oil is customarily much darker. Thus, it is relatively simple to determine when the flow diameter of the oil 24 has been split by means of the tapered, substantially conical end 22 of mandrel means 20, so that its flow diameter substantially matches the internal diameter of extractor tube means 18. In this manner, the flow of fluid into extractor tube means 18 is substantially only the fluid which is desired to be collected, namely oil.

Figure 3:
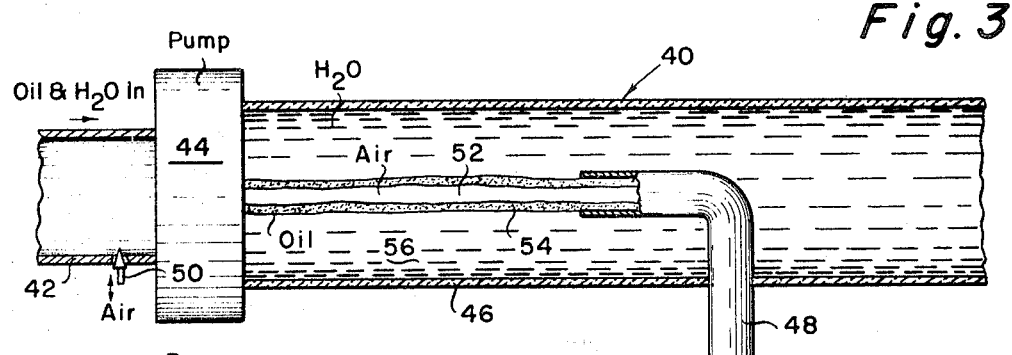
FIG. 3 is a side elevational view taken partially in vertical cross section and showing another fluid separating system; and, FIG. 4 is a side elevational view, taken partially in vertical cross section, and illustrating still another embodiment of the present invention.

Referring now to FIG. 3, there is illustrated another embodiment of the present invention wherein a fluid separating system is indicated generally at 40. As in the previous embodiment, an inlet section is provided at 42 and a fluid separating means, such as an axial flow pump 44 is employed as discussed previously. The outlet section from the axial flow pump 44 is shown at 46 and at least a portion thereof is made at least translucent whereby the position of an extractor tube means 48 may be determined with precision.

In this form of the invention, it is preferred to introduce another fluid, preferably in the intake section 42 of the fluid separating means 44. Thus there is indicated a throttle valve 50 through which air is introduced into the inlet 42 of the fluid separating means 44. The outlet therefrom in outlet section 46 is shown to comprise a plurality of substantially concentric streams indicated to be air 52, oil 54 and water 56. In this form of the invention, by observing the streams as they flow toward extractor tube means 48, the amount of air admitted through air throttle valve 50 is adjusted so that the diameter of the oil stream 54 substantially matches the internal diameter of the extractor tube means 48. Thus only the desired liquid, namely oil, coupled with air is withdrawn by the extractor tube means 48.

Figure 4:
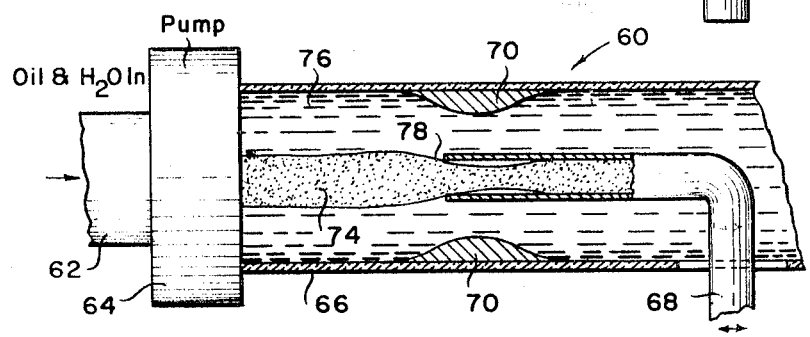

Referring now to FIG. 4, there is illustrated still another embodiment of the present invention wherein means are employed to compress the streams of fluid downstream from the fluid separating means. In this embodiment, a fluid separating system is indicated generally at 60 having an inlet 62, a fluid separating means, such as an axial flow pump 64, an outlet tube portion 66 and an extractor tube means indicated at 68, all similar to those in the previous embodiments.

In this form of the invention, obstruction 70 creates a venturi flow in the oil 74 and water 76 fluids emerging from the fluid separating means 64. In this manner, a compression or necking in of the oil 74 is effected as at 78 whereby the extractor tube means 68 may be positioned axially of the outlet 66 so that the internal diameter of extractor tube 68 substantially matches the compressed flow diameter of oil 74. Thus only oil is extracted through the extractor tube means 68.

While it is preferred to use an axial flow pump in each of the embodiments of the present invention, cyclone separators or other means for separating the fluids into a plurality of substantially concentric flow paths may be employed.

While presently preferred embodiments of the present invention have been illustrated and described, it will be recognized that the invention may be otherwise variously embodied and practiced within the scope of the claims which follow.

What is claimed is:

1. A method of separating fluids having different densities comprising the steps of
   (a) separating a plurality of fluids into a plurality of substantially concentric flow paths,
   (b) altering the flow diameter of at least one of said fluids,
   (c) and positioning an extractor tube in the path of said fluid whose diameter has been altered,
      (1) said altered fluid diameter having some section thereof substantially equal to the inner diameter of said extractor tube whereby substantially all of said fluid whose flow diameter has been altered may be removed from said concentric flow paths.

2. A method of separating fluids as defined in claim 1 including the additional step of observing said fluid to be separated through a portion of a conduit positioned downstream from the point of separation of said fluids with said conduit admitting sufficient light to make said portion of the conduit at least translucent.

3. A method of separating fluids as defined in claim 1 wherein said step of altering the flow diameter of at least one of said fluids comprises inserting a mandrel having a tapered end into the flow of the fluid to be separated and thereby enlarge the flow diameter of said fluid downstream from the point of separation of said fluids into concentric flow paths.

4. A method of separating fluids as defined in claim 2 wherein said step of altering the flow diameter of at least one of said fluids comprises inserting a mandrel having a tapered end into the flow of the fluid to be separated and thereby enlarge the flow diameter of said fluid downstream from the point of separation of said fluids into concentric flow paths.

5. A method of separating fluids as defined in claim 1 wherein said step of altering the flow diameter of at least one of said fluids comprises injecting an additional fluid into the intake of the means used to separate the fluids into a plurality of substantially concentric flow paths, said injected fluid having a density different from the density of the fluid to be separated.

6. A method of separating fluids as defined in claim 5 wherein said additional fluid which is injected into the intake of said means for separating the fluids into a plurality of substantially concentric flow paths is air.

7. A method of separating fluids as defined in claim 2 wherein said step of altering the flow diameter of at least one of said fluids comprises injecting an additional fluid into the intake of the means for separating said fluids into a plurality of substantially concentric flow paths, said injected fluid having a density different from the density of the fluid to be separated.

8. A method of separating fluids as defined in claim 7 wherein said additional fluid which is injected into the intake of the means for separating said fluids into a plurality of substantially concentric flow paths is air.

9. A method of separating fluids as defined in claim 1 wherein said step of altering the flow diameter of at least one of said fluids comprises temporarily compressing the flow diameter by inserting an obstruction in the fluid flow downstream from the means used to separate said plurality of fluids into a plurality of substantially concentric flow paths.

10. A method of separating fluids as defined in claim 9 wherein said obstruction comprises creating a venturi flow downstream from the means used to separate said plurality of fluids into a plurality of substantially concentric flow paths.

11. A method of separating fluids as defined in claim 2 wherein said step of altering the flow diameter of at least one of said fluids comprises temporarily compressing the flow diameter by inserting an obstruction in the fluid flow downstream from the means used to separate the plurality of fluids into a plurality of substantially concentric flow paths.

12. A method of separating fluids as defined in claim 11 wherein said obstruction comprises creating a venturi flow downstream from the means used to separate said fluids into a plurality of substantially concentric flow paths.

References Cited

UNITED STATES PATENTS 3,523,406  8/1970  Chenoweth et al. ____ 210—65 X
3,595,392  7/1971  Markel _____ 210—73

JOSEPH L. DE CESARE, Primary Examiner

U.S. Cl. X.R.

210—84, 94